UNITED STATES PATENT OFFICE.

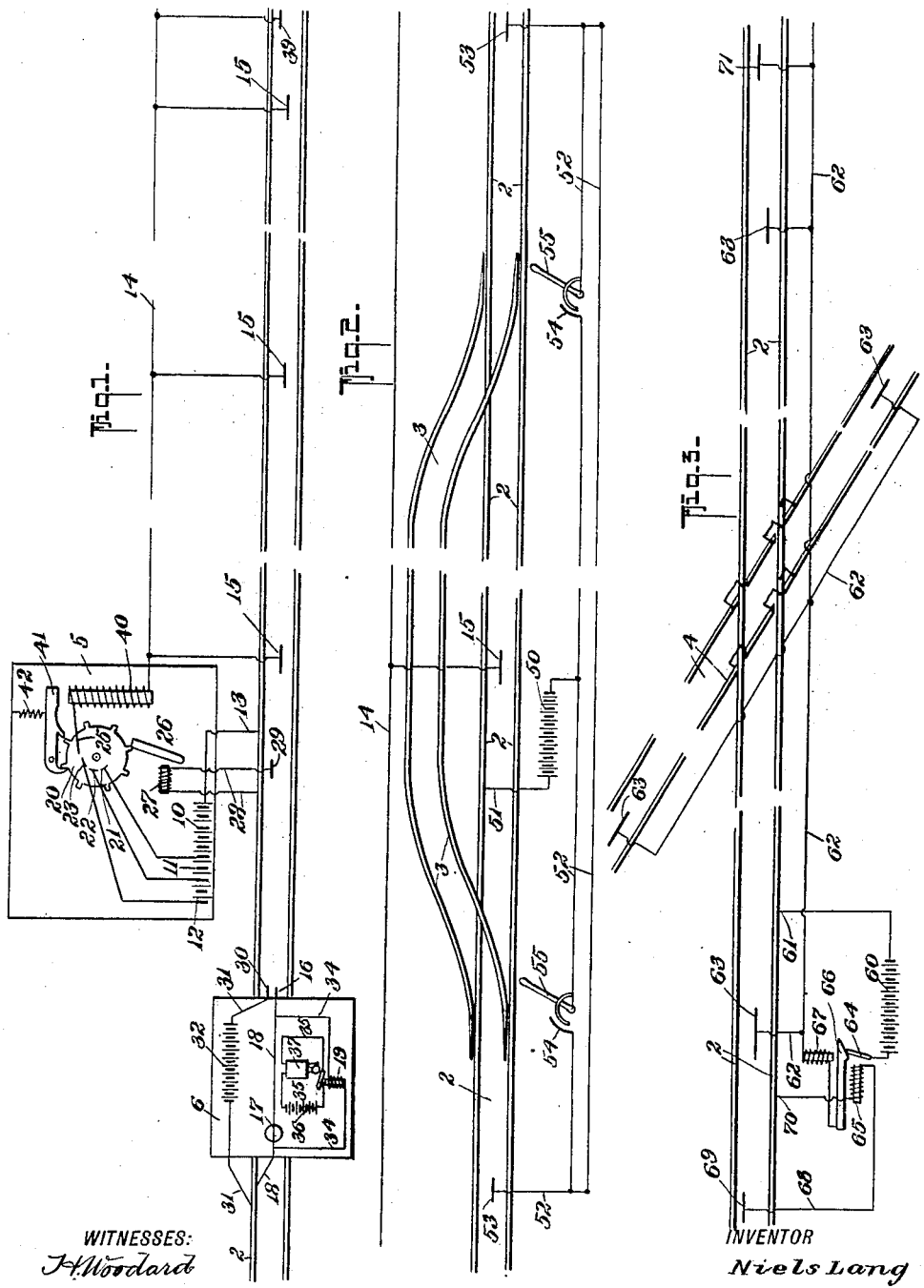

NIELS LANG, OF VANCOUVER, BRITISH COLUMBIA, CANADA.

AUTOMATIC RAILWAY-ALARM.

No. 904,971.     Specification of Letters Patent.     Patented Nov. 24, 1908.

Application filed April 21, 1908. Serial No. 428,381.

*To all whom it may concern:*

Be it known that I, NIELS LANG, citizen of the Dominion of Canada, residing at Vancouver, in the Province of British Columbia, Canada, have invented a new and useful Improvement in Automatic Railway-Alarms, of which the following is a specification.

This invention relates to an electric block signaling system for use on railways to intimate to the driver of a train the presence of other engines of trains on the same section of the line. This intimation is designed to be automatically operative by the entry of an engine onto the section under such protection and is imparted to the driver audibly by the ringing of an alarm bell and visually by a recording voltmeter on the foot plate of the engine. The application of the system may be further extended to protect a train standing on a side track or loop and also to guard against trains meeting on a level crossing.

The system requires the division of the line into a series of sections of a length dependent on the amount of traffic. Each section so divided is provided with a battery of determined strength in a circuit formed by one of the lines of the track and a line wire extending the length of the section, which circuit is closed by the passage of an engine equipped with corresponding apparatus over contact plates arranged at intervals: so that the strength of the battery current of the section is registered on a voltmeter on the engine, each registration being accompanied by the ringing of an alarm bell to draw attention to it.

The section battery is sub-divided, so that the passage of the first engine onto a protected section of the track will connect one section of the battery in the circuit, while the entry of further engines will successively add other sections of the battery series. By this means the strength of the current in the circuit of each section, as shown on his voltmeter, will be an indication to each driver on the track section whether an engine or train precedes or follows him.

The invention is fully described in the following specification, reference being made to the drawings by which it is accompanied, in which:

Figure 1 represents diagrammatically a section of railway track protected by this system with the apparatus of the track section battery box, and that on the locomotive engine, Fig. 2, a similar view showing the supplementary apparatus protecting a loop or side track, and Fig. 3, that protecting a level crossing.

In these drawings 2 represents a section of single line railway track, 3 a loop thereon and 4 a track crossing. The section battery box is represented by 5 and the engine by 6. In the section box 5 is placed a battery 10 having extra groups of cells, 11, 12 or more arranged in series with it. One end of the battery 10 is connected at 13 to one of the rails of the track 2 and the other end of 10, and of each successive group 11 and 12 is separately connected to the line wire 14 through a mechanism to be described, which line wire is connected at intervals to contact plates 15 situated at definite distances from the rails, so as to engage a corresponding contact 16 on the engine 6.

On the engine 6 between the contact plate 16 and the wheels by which contact is made with the track rail to which one end of the battery 10 is connected, is a circuit 18 in which is a voltmeter 17 which will indicate and register the strength of the battery 10 or its series additions when the engine closes the track circuit by contact of 16 with 15.

In the battery box 5 is mounted a rotatable wheel 20 having teeth or projections from its rim and on this wheel is a series of contact plates 21, 22, 23, each of which is separately connected to the terminals of the batteries 10, 11, and 12 which are intended, when the wheel 20 is fractionally rotated, to contact successively with a bar 25 connected to the line circuit 14. The wheel 20 is rotated by means of a prolongation 26 from the pivotally or flexibly mounted armature of an electro-magnet 27 the coil of which is in a circuit 28, one terminal of which is connected to one of the rails of the track 2 and the other to a contact plate 29 in a definite position in relation to the rail to engage a contact 30 on the locomotive 6.

Between the engine contact 30 and the wheels, is a circuit 31 having in it a battery 32, so that when the engine engages the contact 29 the strength of the battery 32 passes round the circuit 28 and sensitizes the electro-magnet 27 and in drawing up its armature the extension 26 of it rotates the wheel 20 through the space of one tooth against the resistance of a light spring and brings one of the wheel contacts 21, 22, or 23, into electrical contact with the bar 25, so that the current from the battery 10 or its series additions may pass into the section line circuit 14 and will be registered on the engine voltmeter 17 when the contact 16 of the engine engages 15 of the track. Thus when an engine approaches the protected section, the circuit 28 is first closed and by the engagement of the contact 30 of the engine with contact 29 of the track the current from the engine battery 32 will sensitize the electro-magnet 27 and cause the wheel 20 to rotate to bring its contact 21 into engagement with the bar 25 when the current from the first section 10 of the line battery will pass into the circuit 14 and its strength will be registered on the engine voltmeter 17. In the voltmeter circuit 18 on the engine, is an electro-magnet 19 which is sensitized when a current passes through the voltmeter circuit and closes a bell circuit 35 having a battery 36 and bell 37, so that an alarm bell will be rung coincident with the registration of a current on the voltmeter and this registration and alarm will occur as the engine passes the several contacts 15 throughout the track section. If a second engine enters on the track it will similarly engage first the contact 29, by which the strength of its battery 32 will rotate the wheel 20 through the space of another tooth and will bring the next contact 22 of the wheel to connect the added section 11 with 10 of the battery into the section line circuit 14 and this increased current over what is known to be the initial battery strength will be indicated on the operating engine voltmeter and will intimate to the driver that an engine precedes him on the section, while the first engine will also receive an alarm and register the increased current when it passes the next contact 15 and will convey to the driver of the first engine an intimation that a second engine follows him, and so on, as other engines enter the section. If an engine approaches from the opposite direction as soon as it engages a contact 15 its driver will be acquainted by its voltmeter whether the section is clear or whether it is occupied by one, two, or more engines or trains.

It now becomes necessary to explain how, when a train passes off the section, the battery strength is cut down to correspond, so that the voltmeter of each engine on that section may indicate what trains occupy the section. Connected with the track line circuit 14 toward the end of the section is a contact 39 situated in a position to be engaged by the contact 30 of the engine. Situated within the battery box in the connection between the contact bar 25 and the line wire 14 is an electro-magnet 40, the armature 41 of which is connected with a pivotally mounted escapement which engages the teeth of the wheel 20 and will release it backward, tooth by tooth, each oscillation of the escapement. The armature of the electro-magnet 40 is held out of contact with the pole of its magnet by a spring 42 strong enough to resist the attraction of the magnet when the current from the batteries 10, 11 and 12 is in the circuit 14, but which will be overcome when the strength of the battery 32 is thrown into the circuit. The strength of the engine battery 32 is added to the circuit of the line wire 14 by engagement of the engine contact 30 with the contact 39 toward the end of the track section. Thus when an engine reaches the end of a section and passes over the contact 39, the strength of the engine battery 32 being added to that in the line wire 14 the electro-magnet 40 is sensitized over the restraining pull of the spring 42, so that its armature 41 is drawn down and, by means of the escapement attached, the wheel 20 is released and will return through the space of one tooth. The last added section of the battery 10, 11, or 12 is thus thrown out of the line wire circuit 14 when an engine passes off the section and the reduced strength of the current in the circuit is indicated on the voltmeter of each engine on the section, when it next passes over one of the contacts 15.

In the protection of a side track or loop 3 a battery 50 is provided adjacent to the loop, one end of which battery is connected at 51 to one of the rails of the track 2, and the other to a circuit 52 connected to contacts 53 which are thrown out a sufficient protecting distance from each end of the loop and are placed to engage the contact 16 of the engine 6. In the circuit 52 are switch contacts 54 which are opened or closed by the movement of the lever 55 which operates at each end the switch to the loop. The switch contacts 54 are designed to be closed by either switch lever 55 when the switches stand open for the loop, so that the strength of the battery 50 can only flow in the circuit 52, when one or the other of the switches stand open to turn a train into the loop. Thus when an engine approaches the loop and the switch at the end of approach stands to pass the train onto the loop as soon as it engages the contact 53 the current of the battery 50 will be indicated on the voltmeter 17 and an alarm will be sounded; while if the switch stands to pass the train along the main track 2, the battery circuit 52 will be open as drawn in Fig. 2, and no current from the battery 50 can pass to the engine and the driver knows that he is safe to proceed.

For the protection of a level crossing 4 a supplementary battery 60 is furnished adjacent to the crossing, one pole of which battery is connected at 61 to the rails of the tracks 2 and 4 and the other, through a contact mechanism to be described, to a circuit wire 62 having contact plates 63 to engage the voltmeter contact 16 of the engine 6.

These contact plates 63 are carried out in each direction from the crossing of the track 4 a sufficient distance to enable a driver to stop before reaching the crossing if it is already occupied by a passing train. The connection 62 from the battery 60 to the contact plate 63 passes through the armature 64 of an electro-magnet 65, which armature when connected to a pivotally mounted latch bar 66 includes the battery 60 in the contact plate circuit 62. In the circuit 62 is the coil of an electro-magnet 67 which, when a current of the required strength passes through it, will act to lift the latch bar 66 which forms its armature, but this will not occur until the strength of the battery 60 is supplemented by that of the engine battery 32 in a manner to be described later. One end of the coil of the electro-magnet 65 is connected by a wire 68 to a contact plate 69 and the other end at 70 to one of the track rails 2. So that when an engine approaching a crossing engages the contact plate 69, the current from the engine battery 32 will sensitize the electro-magnet 65 and its armature 64 will be drawn up and latched to 66 thus throwing the battery 60 into the circuit 62 with which the contacts 63 are connected. Under this condition if any other engine approaches the crossing, as soon as its contact 16 engages one of the contact plates 63 the strength of the battery 60 will be indicated on its voltmeter and will give an intimation to the driver that an engine or train is occupying the crossing. When the engine having passed the crossing is leaving its safe limits, its contact 30 engages a contact 71 which is connected to the battery circuit 62 and the strength of the engine battery 32 will be added to that of 60 already in the circuit. This increased current passing through the coil of the electro-magnet 67 will lift the latch bar 66 and release the armature 64, thus opening the battery circuit and leaving it in its normal condition.

Obviously a contact plate 69 will be placed on each line of approach to a crossing and connected in the circuit 68. These contacts and connections have been omitted from Fig. 3 to avoid complication of the diagram.

Having now particularly described my invention and the manner of its operation, I hereby declare that what I claim as new and desire to be protected in by Letters Patent, is:

1. In an automatic railway alarm system, an electric circuit extending the length of the section of track to be protected which circuit is designed to be closed by the entrance onto it of an engine suitably equipped, means by which the entrance of an engine onto the section will automatically direct an electric current into the section circuit and means by which the entrance of other engines onto the section will successively increase the strength of such current, means for successively reducing by the last added increment the strength of the current in the section circuit for each engine which leaves the section end, means on the engine for registering the strength of the current in the section circuit and for sounding an alarm at each increase of said current.

2. In an automatic railway alarm system, an electric circuit extending the length of the section of track to be protected which circuit is designed to be closed by the entrance onto it of an engine suitably equipped, means for automatically directing an electric current into the section circuit means for automatically increasing the strength of such current with every further engine which enters on the section, means for successively reducing by the last added increment the strength of the current in the circuit as an engine leaves the section, and means on each engine for registering the strength of the current in the section circuit.

3. In an automatic railway alarm system, an electric circuit extending throughout the length of the section of track to be protected one end of which circuit is connected to the rails of the track and the other to a series of contact plates arranged at intervals along the protected section of track, a corresponding contact forming a terminal of a closing circuit on an engine occupying the section in which circuit is a registering voltmeter and an electric bell contact, means for directing an electric current into the section circuit said means being operable by an electro-magnet on the track section sensitized by current furnished from the engine, which current is automatically delivered as the engine passes onto the section, means for reducing the strength of the current in the track section as the engine leaves the section said means being operable by temporarily supplementing the strength of the current in the track section by adding to it a current from the engine.

In testimony whereof I have signed my name to this specification in the presence of two subscribing witnesses.

NIELS LANG.

Witnesses:
CLIVE S. CARMAN,
ROWLAND BRITTAIN.